(12) United States Patent
Courth et al.

(10) Patent No.: US 12,030,471 B2
(45) Date of Patent: Jul. 9, 2024

(54) METHOD FOR MONITORING A HYDRAULIC BRAKE SYSTEM FOR A MOTOR VEHICLE AND BRAKE SYSTEM

(71) Applicant: Continental Teves AG & Co. OHG, Frankfurt am Main (DE)

(72) Inventors: Christian Courth, Frankfurt am Main (DE); Anne Seidel, Frankfurt am Main (DE); Ulrich Lohse, Frankfurt am Main (DE); Andreas Neu, Frankfurt am Main (DE); Roland Caspari, Frankfurt am Main (DE)

(73) Assignee: CONTINENTAL TEVES AG & CO. OHG, Frankfurt am Main (DE)

( * ) Notice: Subject to any disclaimer, the term of this patent is extended or adjusted under 35 U.S.C. 154(b) by 837 days.

(21) Appl. No.: 16/973,499

(22) PCT Filed: Jun. 18, 2019

(86) PCT No.: PCT/EP2019/065934
§ 371 (c)(1),
(2) Date: Dec. 9, 2020

(87) PCT Pub. No.: WO2020/002035
PCT Pub. Date: Jan. 2, 2020

(65) Prior Publication Data
US 2021/0245725 A1 Aug. 12, 2021

(30) Foreign Application Priority Data

Jun. 25, 2018 (DE) .................... 10 2018 210 310.0
Oct. 31, 2018 (DE) .................... 10 2018 218 693.6

(51) Int. Cl.
*B60T 17/22* (2006.01)
*B60T 7/04* (2006.01)
(Continued)

(52) U.S. Cl.
CPC ............ *B60T 17/221* (2013.01); *B60T 7/042* (2013.01); *B60T 8/4081* (2013.01);
(Continued)

(58) Field of Classification Search
CPC ................ B60T 13/745; B60T 13/686; B60T 2270/404; B60T 2270/406;
(Continued)

(56) References Cited

U.S. PATENT DOCUMENTS 5,551,770 A * 9/1996 Hrovat .................... B60T 8/175
303/167
9,555,786 B2 1/2017 Feigel
(Continued)

FOREIGN PATENT DOCUMENTS

CN 104159796 A 11/2014
DE 102012201535 A1 10/2012
(Continued)

OTHER PUBLICATIONS

German Search Report for German Application No. 10 2018 218 693.6, dated Jul. 25, 2019 with partial translation, 9 pages.
(Continued)

*Primary Examiner* — Bradley T King
(74) *Attorney, Agent, or Firm* — BUCHANAN INGERSOLL & ROONEY PC

(57) ABSTRACT

A method for monitoring a hydraulic brake system for a motor vehicle, wherein a diagnostic valve is omitted and, instead, air volume and leakage are identified by a volume balance during generation of a dynamic pressure. An associated brake system is also disclosed.

14 Claims, 9 Drawing Sheets

(51) Int. Cl.
  *B60T 8/40* (2006.01)
  *B60T 13/14* (2006.01)
  *B60T 13/66* (2006.01)
  *B60T 13/74* (2006.01)
(52) U.S. Cl.
  CPC .......... *B60T 13/145* (2013.01); *B60T 13/662* (2013.01); *B60T 13/745* (2013.01); *B60T 2270/10* (2013.01); *B60T 2270/402* (2013.01); *B60T 2270/404* (2013.01); *B60T 2270/406* (2013.01); *B60T 2270/82* (2013.01); *B60T 2270/88* (2013.01)
(58) Field of Classification Search
  CPC .. B60T 2270/413; B60T 7/042; B60T 17/221; B60T 8/4081; B60T 13/145; B60T 13/662; B60T 2270/10; B60T 2270/402; B60T 2270/82; B60T 2270/88
  See application file for complete search history.

(56) References Cited

U.S. PATENT DOCUMENTS

| | | | |
|---|---|---|---|
| 10,059,321 | B2 | 8/2018 | van Zanten et al. |
| 10,173,653 | B2 | 1/2019 | Biller |
| 10,315,639 | B2 | 6/2019 | Choi et al. |
| 10,919,512 | B2 * | 2/2021 | Foitzik .................... B60T 8/885 |
| 2017/0158184 | A1 | 6/2017 | Choi et al. |
| 2019/0299962 | A1 | 10/2019 | Leiber et al. |
| 2020/0039479 | A1 * | 2/2020 | Volkmar .................. B60T 1/065 |
| 2020/0114894 | A1 * | 4/2020 | Leiber ...................... B60T 7/042 |
| 2021/0122349 | A1 * | 4/2021 | Leiber ...................... B60T 7/042 |
| 2022/0105914 | A1 * | 4/2022 | Leiber ................... B60T 13/662 |
| 2022/0126806 | A1 * | 4/2022 | Leiber ..................... F15B 11/17 |

FOREIGN PATENT DOCUMENTS

| | | |
|---|---|---|
| DE | 102015106089 A1 | 10/2016 |
| DE | 102016224057 A1 | 6/2017 |
| DE | 102016112971 A1 | 1/2018 |
| DE | 102016222578 A1 | 5/2018 |
| KR | 1020150052270 A | 5/2015 |

OTHER PUBLICATIONS

International Search Report and Written Opinion for International Application No. PCT/EP2019/065934, dated Sep. 11, 2019, 8 pages.
International Search Report and Written Opinion for International Application No. PCT/EP2019/065934, dated Sep. 11, 2019, 14 pages (German).
Chinese Office Action for Chinese Application No. 201980042485. 1, dated Aug. 30, 2022, with translation, 11 pages.
Korean Notification of Reason for Refusal for Korean Application No. 10-2020-7036286, dated Apr. 20, 2022 with translation, 20 pages.

* cited by examiner

METHOD FOR MONITORING A HYDRAULIC BRAKE SYSTEM FOR A MOTOR VEHICLE AND BRAKE SYSTEM

CROSS REFERENCE TO RELATED APPLICATIONS

This application is the U.S. National Phase Application of PCT International Application No. PCT/EP2019/065934, filed Jun. 18, 2019, which claims priority to German Patent Application No. 10 2018 210 310.0, filed Jun. 25, 2018, and to German Patent Application No. 10 2018 218 693.6, filed Oct. 31, 2018, the contents of such applications being incorporated by reference herein.

FIELD OF THE INVENTION

The invention relates to a method for monitoring a hydraulic brake system for a motor vehicle and to a brake system for carrying out such a method.

BACKGROUND OF THE INVENTION

It is typically demanded of brake systems, in particular vacuumless brake systems with a hydraulic fall-back level, that, within the hydraulic fall-back level, a driver can decelerate their vehicle at least 2.44 m/s$^2$. Here, the hydraulic fall-back level may typically be designed in the form of a tandem master brake cylinder or a master brake cylinder, which is connected to respective wheel brakes at wheels. In the context of this application, the term "master brake cylinder" is basically also to be understood as encompassing a tandem master brake cylinder.

The target deceleration of 2.44 m/s$^2$ is achieved for example through configuration of the master brake cylinder volume. Air and leakage can however jeopardize the configuration such that the target deceleration is no longer attained. It is known in the prior art to check the master brake cylinder volume for air and leakage using a diagnostic valve. Said diagnostic valve is typically arranged between the master brake cylinder and a reservoir.

SUMMARY OF THE INVENTION

An aspect of the invention is an alternative, for example simpler design for this. This is achieved according to an aspect of the invention by means of a method and a brake system according to the respective main claims. Advantageous refinements can be found, for example, in the respective dependent claims. The content of the claims is incorporated in the content of the description by express reference.

An aspect of the invention relates to a method for monitoring a hydraulic brake system for a motor vehicle. The brake system has a master brake cylinder with at least one breather hole, an electrically operated pressure generator, a simulator, a simulator valve and a main line. It should be understood that the master brake cylinder may for example be a single master brake cylinder or a tandem master brake cylinder.

The master brake cylinder is connected to the pressure generator via the main line and the simulator is connected via the simulator valve to the main line between master brake cylinder and pressure generator.

The method comprises the following steps:
generating a volume flow by means of the pressure generator, wherein the volume flow flows from the pressure generator via the main line to the master brake cylinder and exits the latter via the breather hole, establishing a volume balance as the difference between the volume that has been discharged from the pressure generator into the main line up to a particular time minus a volume that has exited the master brake cylinder via the breather hole up to the particular time, and identifying a state of the brake system on the basis of the volume balance or on the basis of a profile with respect to time of the volume balance.

It has been found that, through the establishment of the abovementioned volume balance and/or the derivative thereof with respect to time, typical faults such as leakages and undesired air in a master brake cylinder or surrounding part of a brake system can be identified without the need to use a diagnostic valve for this. In this way, the diagnostic valve can be omitted, which saves expenditure in the production process and simplifies packaging.

The brake system may typically comprise further components. For example, it may comprise wheel valves such as inlet valves and outlet valves. These can also be advantageously utilized in the context of the method. For example, inlet valves can be closed in order that pressure generator and master brake cylinder are separated from the wheels.

In one embodiment, the volume that has been discharged from the pressure generator into the main line up to the particular time is determined on the basis of operating data of the pressure generator. For example, the discharged volume can be inferred on the basis of a mechanical configuration and applied voltage and/or current values.

In one embodiment, the volume that has exited the master brake cylinder via the breather hole up to the particular time is determined by integration of an outflow of the volume flow through the breather hole over time. This has proven to be an exact means of determination.

The outflow may be determined in particular on the basis of an aperture parameter and a measured pressure in the brake system or in the master brake cylinder.

The outflow may preferably be determined as a product of aperture parameter and the square root of the pressure; and/or as a product of aperture parameter and pressure; and/or as a sum of a product of a first aperture parameter and the pressure, on the one hand, and a product of a second aperture parameter and the square root of the pressure, on the other hand.

It is pointed out that, with such calculation specifications, the rule "multiplication and division before addition and subtraction" must fundamentally be observed.

The procedure just mentioned for calculating the outflow has proven reliable for typical applications. In particular, it has been found here that, at low temperatures, for example <0° C., the outflow can be calculated from the product of aperture parameter and pressure. At higher temperatures, for example >0° C., the outflow can advantageously be calculated as a product of aperture parameter and square root of the pressure. Through the use of two separate aperture parameters, allowance can be made for the different temperature ranges and the respective outflow behavior, wherein, for example, the first aperture parameter and the second aperture parameter may be configured to be temperature-dependent. It is for example possible that, the lower the temperature, the higher the first aperture parameter, and vice versa.

Where the determination of an aperture parameter is mentioned below, it should be understood that corresponding methods may also be extended to multiple aperture parameters.

The aperture parameter may in particular be determined iteratively. It may also be determined using a parameter estimation method such as for example LMS (Least Mean Squares) or RLS (Recursive Least Squares). In particular, this may be performed such that the volume flow and the outflow are equal in the steady state.

The aperture parameter may in particular be iterated as follows:

$$\hat{c}_k = \hat{c}_{k-1} + \mu \times (Q_k - \hat{c}_{k-1} \times \sqrt{P_K}), \quad (1)$$

where $\hat{c}_k$ is the aperture parameter at the iteration step k,
$\mu$ is an iteration parameter,
$Q_k$ is the volume flow at the iteration step k, and
$P_k$ is the pressure at the iteration step k.

Such a procedure has proven to be a practicable and precise method for determining the aperture parameter for typical applications. It should be understood that, as already mentioned further above, the dependency of the outflow may also deviate from the described function with the square root of the pressure, wherein, in such a case, the corresponding calculation rule for the aperture parameter may also be adapted. For example, the above square root may be omitted, such that the aperture parameter $\hat{c}_{k-1}$ is multiplied directly by the pressure $P_k$.

The aperture parameter is preferably determined in the presence of constant pressure and/or in the presence of constant volume flow. This allows a precise determination of the aperture parameter, because no changes in pressure or volume flow are to be expected.

Possible embodiments will be described below, wherein it should be mentioned that these may also serve as a substitute for some of the method steps contained in claim 1 on the filing date.

In one possible embodiment, the volume flow is generated continuously for a period of time with the simulator valve closed. An air volume in the master brake cylinder may be determined on the basis of an initial volume balance. This is based on the recognition that, if an undesired air volume is present in the master brake cylinder, this is initially compressed, which occurs relatively quickly, and during the compression process it is typically the case that more volume enters the master brake cylinder than exits the latter. Also, a leakage of the simulator valve may be determined on the basis of a volume balance over the period of time. This is based on the recognition that, if a leak occurs over a relatively long period of time, more volume is discharged from the pressure generator than flows out via the breather hole, because the leakage gives rise to an additional volume outflow which can be identified in the context of the volume balance already described.

The aperture parameter may be determined after a predefined or determined initial time in the period of time. It should be understood that a particular aperture parameter may then also be used for measured values occurring at a time before the determination of the aperture parameter.

In one possible embodiment, the volume flow is generated for a first period of time with the simulator valve open, wherein the simulator valve is subsequently closed for a second period of time with the pressure generator deactivated, the volume flow is subsequently generated for a third period of time with the simulator valve open, and leakage of the simulator valve is in turn subsequently ascertained in the third period of time on the basis of a volume balance.

This procedure is based on the recognition that the simulator can first be charged by means of the volume flow and then leakage through the simulator valve can be ascertained by closing said simulator valve and detecting a volume that has emerged from the simulator.

Here, the aperture parameter may be determined in particular in the first period of time and/or in the third period of time after charging of the simulator. Determination in both periods of time is also possible.

An aperture is preferably arranged in the breather hole or downstream of the breather hole in terms of flow. A flow cross section can thus be reduced in a defined manner such that a pressure can be built up. Alternatively, it is for example also possible for a restrictor to be used.

In particular, a linear actuator may be used as pressure generator. This has proven successful for typical brake systems. Use may however also be made of other electrically operated devices for generating a fluidic pressure.

An aspect of the invention furthermore relates to a brake system for a motor vehicle. The brake system has a master brake cylinder with a breather hole, an electrically operated pressure generator, a simulator, a simulator valve and a main line. The master brake cylinder is connected to the pressure generator via the main line and the simulator is connected via the simulator valve to the main line between master brake cylinder and pressure generator.

The brake system furthermore has an electronic control device which is configured for carrying out a method according to an aspect of the invention. In this context, it is possible to revert to all of the embodiments and variants described herein.

BRIEF DESCRIPTION OF THE DRAWINGS

Further features and advantages will be taken by a person skilled in the art from the exemplary embodiment described below with reference to the appended drawing, in which.

DETAILED DESCRIPTION OF THE PREFERRED EMBODIMENTS

Figure 1:
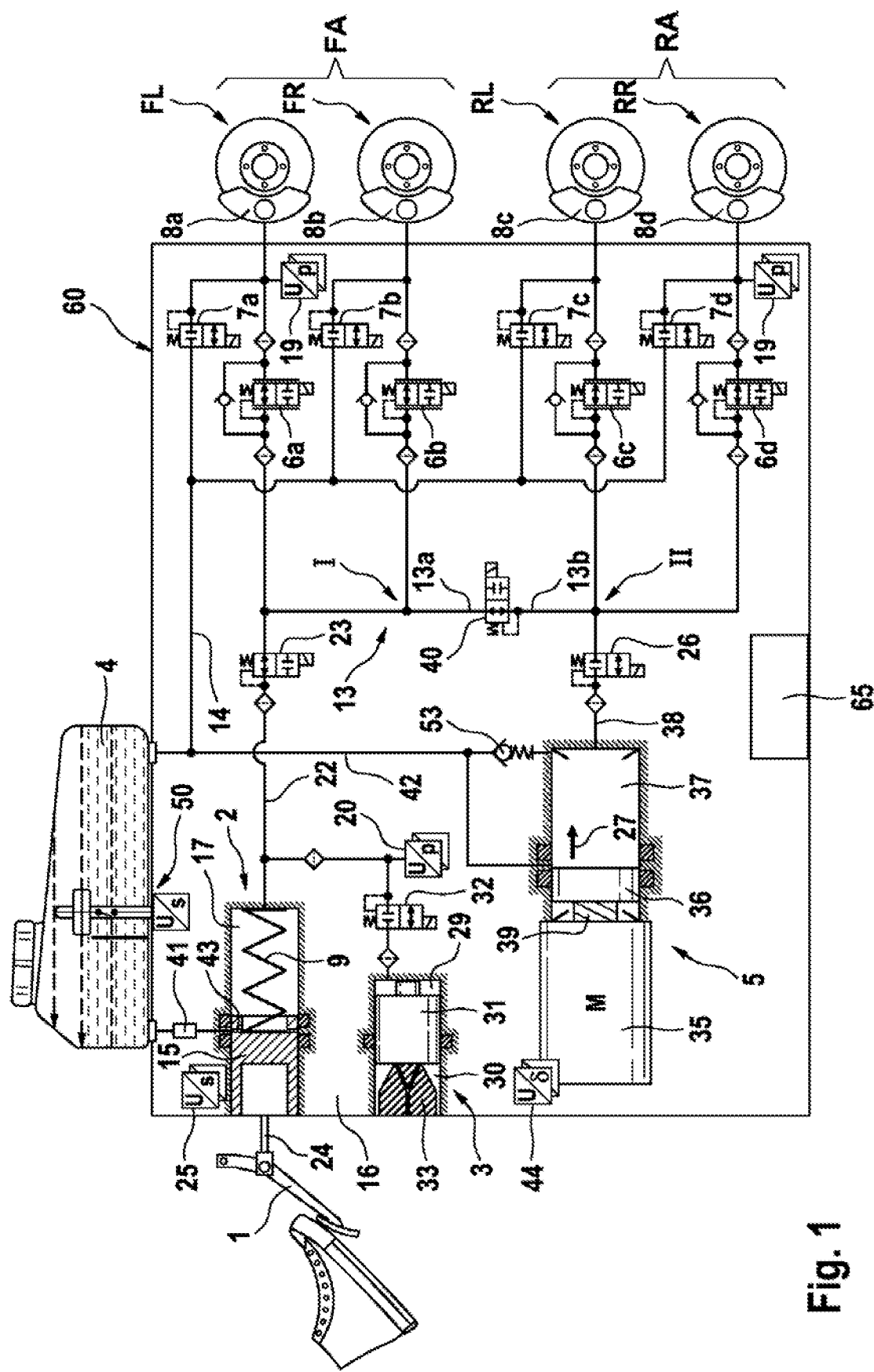
FIG. 1: shows a brake system.

FIG. 1 shows a brake system according to an exemplary embodiment of the invention. The brake system is arranged in a housing 60 and has a control device 65, illustrated merely schematically, for controlling the components described below.

The brake system has a brake pedal 1 by means of which a driver can transfer a driver braking demand to the brake system. The brake system has a master brake cylinder 2, in the interior 17 of which there are situated a piston 15 and a spring 9. The piston 15 can be moved counter to the spring 9 by means of the brake pedal 1. The position of said piston is monitored by means of a sensor 25.

The brake system has a brake fluid reservoir 4. Here, the master brake cylinder 2 is connected to the brake fluid reservoir 4 via a breather hole 43. This connection is realized via an aperture 41 which constricts the throughflow between the breather hole 43 and the brake fluid reservoir 4 in a defined manner.

The brake fluid reservoir 4 is situated on a top side 50 of the housing 60.

The brake system has a simulator 3. A simulator piston 31 and a spring 33 are located in the interior 30 of said simulator. The simulator 3 is connected via a simulator valve 32 to the master brake cylinder 2. When the simulator valve 32 is open, a volume displaced by the piston 15 in the master brake cylinder 2 can be conducted directly into the simulator 3 and received there in a space 29 situated opposite the spring 33. In this way, the simulator piston 31 is pressed against the spring 33, which generates a realistic braking feel for the driver.

A pressure prevailing at the master brake cylinder 2 can be measured by means of a pressure sensor 20.

The brake system has a pressure generator 5, which in turn has a motor 35 which can move an actuator piston 36 in an interior space 37. Here, to generate pressure, the actuator piston 36 is moved in accordance with the arrow 27. A rotation-translation transmission 39 is used for the drive of the actuator piston 36 by the motor 35. The pressure generator 5 is thus in the form of a linear actuator. Said pressure generator is connected via a check valve 53 to the brake fluid reservoir 4 via a suction line 42.

Leading away from the master brake cylinder 2 is a main line 22, which is connected via a first intermediate valve 23 and a second intermediate valve 40 and intermediate connection lines 13a, 13b to two junctions I, II and to wheel valves to be described further below. The pressure generator 5 is likewise connected to the junctions I, II and to the wheel valves via a third intermediate valve 26. The first intermediate valve 23 can also be referred to as an isolating valve.

The wheel valves are inlet valves 6a, 6b, 6c, 6d and outlet valves 7a, 7b, 7c, 7d, which are connected to brakes 8a, 8b, 8c, 8d. Said brakes 8a, 8b, 8c, 8d are assigned to respective wheels, wherein a first brake 8a is assigned to a front left (FL) wheel, a second brake 8b is assigned to a front right (FR) wheel, a third brake 8c is assigned to a rear left (RL) wheel and a fourth brake 8d is assigned to a rear right (RR) wheel. The front left wheel and the front right wheel are mounted on a front axle (FA). The rear left wheel and the rear right wheel are mounted on a rear axle (RA).

It is basically possible, during a normal braking process, to isolate the master brake cylinder 2 from the inlet valves 6a, 6b, 6c, 6d by means of the first intermediate valve 23 and to conduct the pressure generated by a driver to the simulator 3 exclusively via an open simulator valve 32. Here, a driver braking demand is detected by means of the travel sensor 25 already mentioned and is implemented by means of pressure generation by the pressure generator 5. Here, more extensive functionality may likewise be implemented, for example an anti-lock braking system (ABS) function can be implemented by means of the outlet valves 7a, 7b, 7c, 7d, which are connected to the brake fluid reservoir 4 via a return line 14.

A pressure in the brake system can be monitored by means of additional pressure sensors 19.

It should be understood that, in typical embodiments according to the prior art, a diagnostic valve would be installed instead of the aperture 41 already mentioned. Said diagnostic valve is designed to be switchable and can serve for isolating the master brake cylinder 2 from the brake fluid reservoir 4. In this case, if a constant motor torque of the electric motor 35 is demanded, a constant pressure can be generated in the master brake cylinder 2 and an error measure for air and leakage can be formed directly by means of the displaced volume in the linear actuator 5, because the displaced volume corresponds to the required volume for compression of an air bubble and to the leakage volume that increases over time.

In the embodiment described here, the diagnostic valve provided according to the prior art is replaced by a hydraulic resistance, in the present case in the form of the aperture 41. Here, the test pressure is not static, but is generated dynamically in the form of a dynamic pressure. An error measure can typically be obtained not by means of the displaced volume in the pressure generator 5 but by means of a volume balance in the master brake cylinder 2. Instead of an aperture 41, use may for example also be made of a restrictor. It is also permissible for the hydraulic resistance to spread across different braking systems. The hydraulic resistance should only be large enough for the required dynamic pressure.

It should be mentioned that, in an alternative solution, it is for example possible for a connection between master brake cylinder 2 and brake fluid reservoir 4 to be optimized for hydraulic resistance, for example through modification of the breather hole bores. Below, for simpler discussion, it should be assumed that said hydraulic resistance is an aperture 41, as already mentioned.

A dynamic pressure can be generated by virtue of the actuator piston 36 being displaced by the motor 35 in the direction of its volume displacement. Here, the valves already mentioned are switched in such a way that the volume displaced by the actuator piston 36 passes directly into the master brake cylinder 2. For this purpose, in particular, the three intermediate valves 23, 26, 40 are opened and the inlet valves 6a, 6b, 6c, 6d are closed. For as long as the actuator piston 36 is being displaced, volume flows out via the aperture 41 and generates a dynamic pressure which is the cause of the volume flow.

Because volume is constantly flowing out via the aperture 41, the displaced volume cannot be utilized directly as an error measure. Instead, a volume balance is calculated from the sum of the inflowing volume flow $Q_k^{Plunger}$ and of the volume flow $Q_k^{Aperture}$ flowing out via the aperture. At a sampling time k and for a sampling time T, a volume balance $V_k$ can be calculated as follows:

$$V_k = \Sigma T \times Q_k^{Plunger} - \Sigma T \times Q_k^{Aperture}. \qquad (2)$$

A positive volume balance $V_k$ reflects volume which has flowed into the master brake cylinder 2 or at least in the direction thereof but has not flowed out into the brake fluid reservoir 4. It can—as will be shown later—be used as an error measure for the identification of air and leakage. The volume flow $Q_k^{Aperture}$ is not a measured variable and can be estimated for a master brake cylinder pressure P using the aperture equation with an aperture parameter $C_k$:

$$Q_k^{Aperture} = c_k \times \sqrt{P_k}. \qquad (3)$$

As already mentioned further above, the following formula can also be used depending on the temperature range:

$$Q_k^{Aperture} = c_k \times P_k \qquad (4)$$

Since the aperture parameter $c_k$ of the hydraulic resistance differs greatly versus system and temperature, the aperture parameter $c_k$ can be estimated using an identification method. Furthermore, a Least Means Squares algorithm (LMS) may for example be used for this purpose:

$$\hat{c}_k = \hat{c}_{k-1} + \mu \times (Q_k - \hat{c}k\text{-}1 \times \sqrt{P_k}). \qquad (5)$$

This formula will be referred to below in particular as a formula for aperture estimation.

In order that the estimated aperture parameter $ĉ_k$ converges on the true value of the hydraulic resistance, the dynamic pressure should have settled to a steady state. Here, the simulator 3 and the master brake cylinder 2 no longer take in any further volume and the entire volume displaced by the piston 36 flows out via the hydraulic resistance in the form of the aperture 41. The volume balance should therefore, in the following, be temporally separated from the aperture estimation, such that the volume is balanced on the basis of an already converged aperture parameter $ĉ_{converged}$:

$$V_k = \Sigma T \times Q_k^{Plunger} - ĉ_{converged} \times T \times \sqrt{P_k}. \quad (6)$$

This formula will be referred to below in particular as a formula for volume balance.

On the basis of the basic concept above, a description will now be given, on the basis of two possibilities for checking, of how air in the master brake cylinder and leakage via the simulator valve can be estimated. For the sake of simplicity, the volume of the pressure generator 5 is assumed here to be non-exhaustible.

First possibility for checking

For the identification of air and leakage, the simulator 3 is firstly separated from the master brake cylinder 2 by closure of the simulator valve 32, and a constant volume flow is generated by means of the pressure generator 5. The dynamic pressure generated in the master brake cylinder 2 compresses any air bubble that may be present. The volume balance according to the above formula (6) encompasses the additional volume intake and corresponds approximately to the volume of the air bubble.

Figure 8:
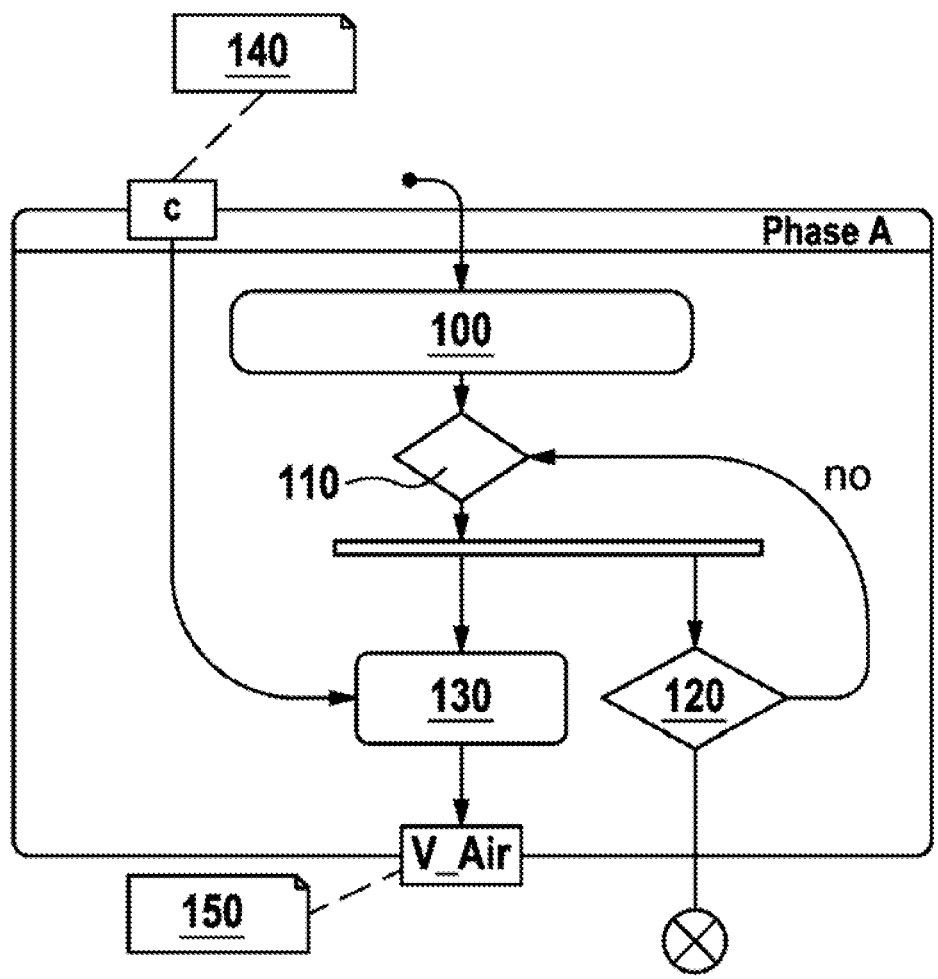
FIG. 8: shows a flow diagram relating to the first possibility for checking.

For illustrative purposes, a corresponding algorithm according to FIG. 8 was implemented and simulated for a system according to FIG. 1 with an air bubble in the master brake cylinder 2. Here, the air bubble had a volume of 2 cm³ at atmospheric pressure.

According to the method sequence illustrated in FIG. 8, it is firstly the case in block 100 that a constant plunger volume flow, which generates dynamic pressure, is generated with the simulator valve 32 closed. The pressure generator 5 is used for this purpose.

In the rhombuses 110, 120, it is checked whether the dynamic pressure is in a steady state. For as long as this is not the case, the corresponding decision processes are repeated.

In the presence of a steady-state dynamic pressure, in block 130, the volume balance is iterated in accordance with the above formula (6). For this purpose, aperture parameters c are used which originate from an aperture parameter estimation implemented in block 140.

When the volume flow has been iterated, the volume of the air bubble at atmospheric pressure V_Air can be determined, as will be discussed in more detail further below with reference to FIGS. 2, 3 and 4. As an end result, it is possible, for example in block 150, for a volume balance to be output in the form of an air volume.

Figure 2:
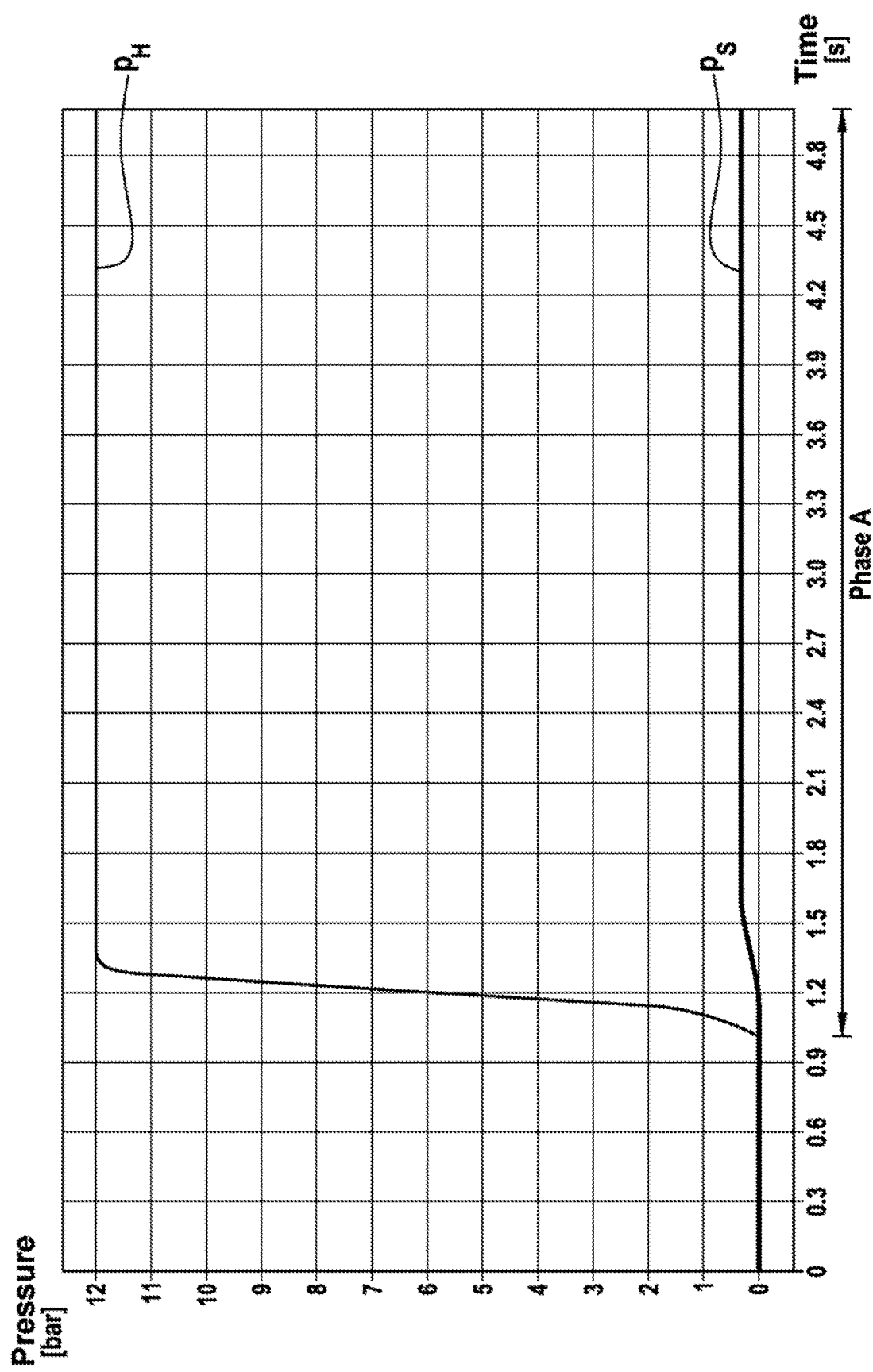
FIGS. 2 to 4: show diagrams relating to a first possibility for checking.
Figure 3:
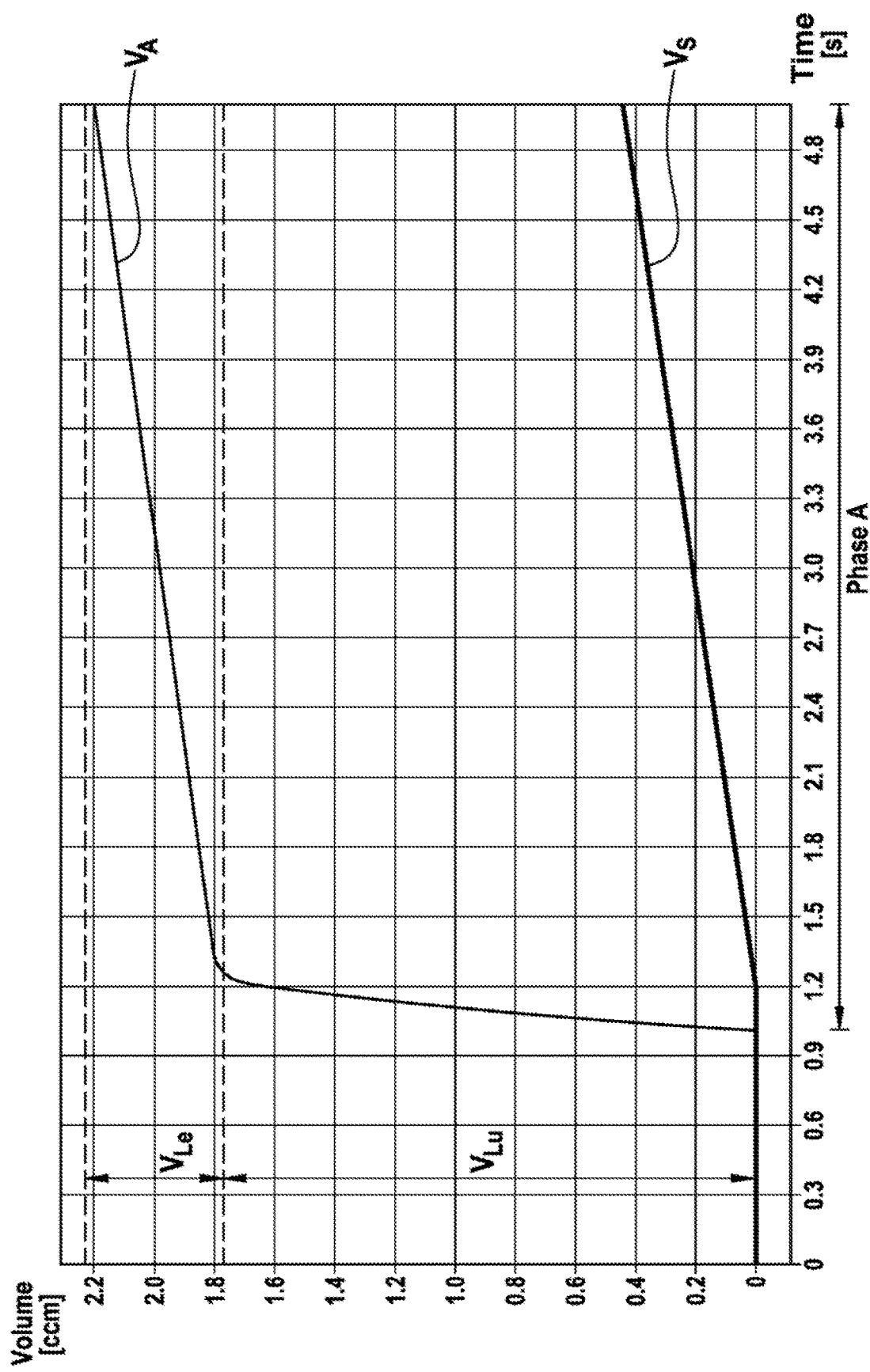
Figure 4:
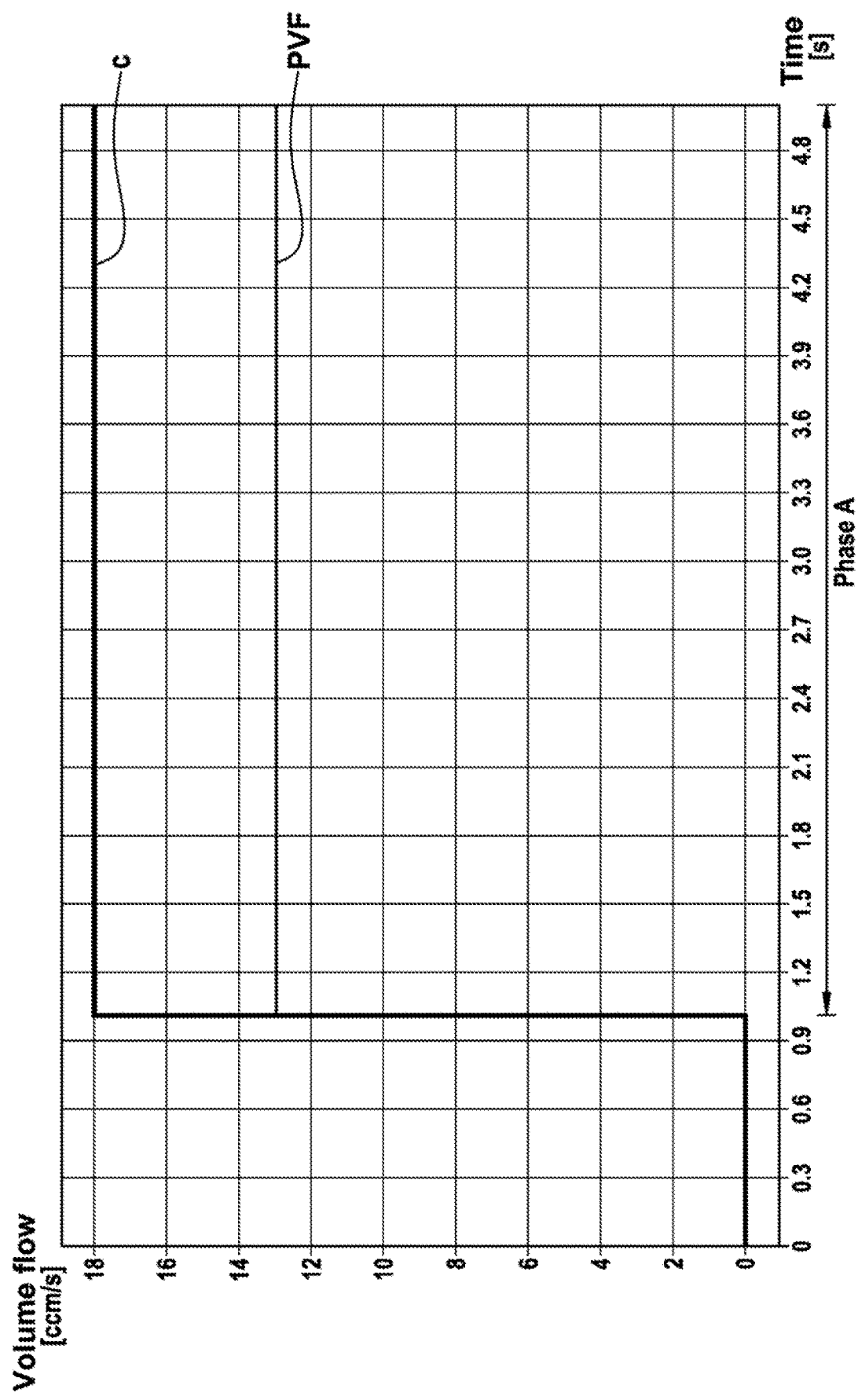

Here, in FIG. 8, a phase A is shown, which is also shown in FIGS. 2, 3 and 4 described below.

The corresponding results are illustrated in FIG. 2, FIG. 3 and FIG. 4. Here, FIG. 2 shows the profile with respect to time of pressures, FIG. 3 shows the profile with respect to time of volumes, and FIG. 4 shows the profile with respect to time of volume flows and the aperture parameter.

It can be seen in FIG. 2 that the pressure $p_H$ in the master cylinder 2 rises after the start of the application of pressure (that is to say in phase A), wherein the air volume firstly has to be overcome. Only somewhat later does a pressure $p_s$ build up in the simulator 3, said pressure being caused by leakage in the simulator valve.

FIG. 3 shows a volume balance VA in the form of a charging volume of the master brake cylinder 2 and a volume $V_s$ of the simulator 3. As can be seen in FIG. 3, air is determined from the volume balance to be 1.8 cm³ after 200 ms. This corresponds to the plotted air volume $V_{Lu}$. After 1.2 s, the volume balance VA continues to rise. The reason for this is a leakage of 10 mm³/s/bar via the simulator valve 32 from the master brake cylinder 2 to the simulator 3. This is referred to as charging volume and corresponds to the plotted leakage-induced volume $V_{Le}$.

The volume flow from the pressure generator (plunger volume flow PVF) illustrated in FIG. 4 remains constant during this procedure, as does the likewise plotted aperture parameter c.

It can thus be seen that identification of air and leakage is possible even without a diagnostic valve. In particular, an air volume V_Air can be identified using V_Lu in the master brake cylinder 2, which gives an indication of undesired air that could impair braking deceleration.

The volume of the air bubble V_Air can be inferred using V_Lu, assuming an adiabatic process. Here, the following relationship applies:

$$V\_air * 1bar = (V\_Air - V\_lu) * (p\_H + 1bar).$$

For the example with V_lu=1.8 cm³ and a steady-state dynamic pressure in the master cylinder of p_H=11.9 bar, the result is a value of V_Air of 1.95 cm³ and thus a value corresponding to the volume of the simulated air bubble at atmospheric pressure.

Second Possibility for Checking

Figure 5:
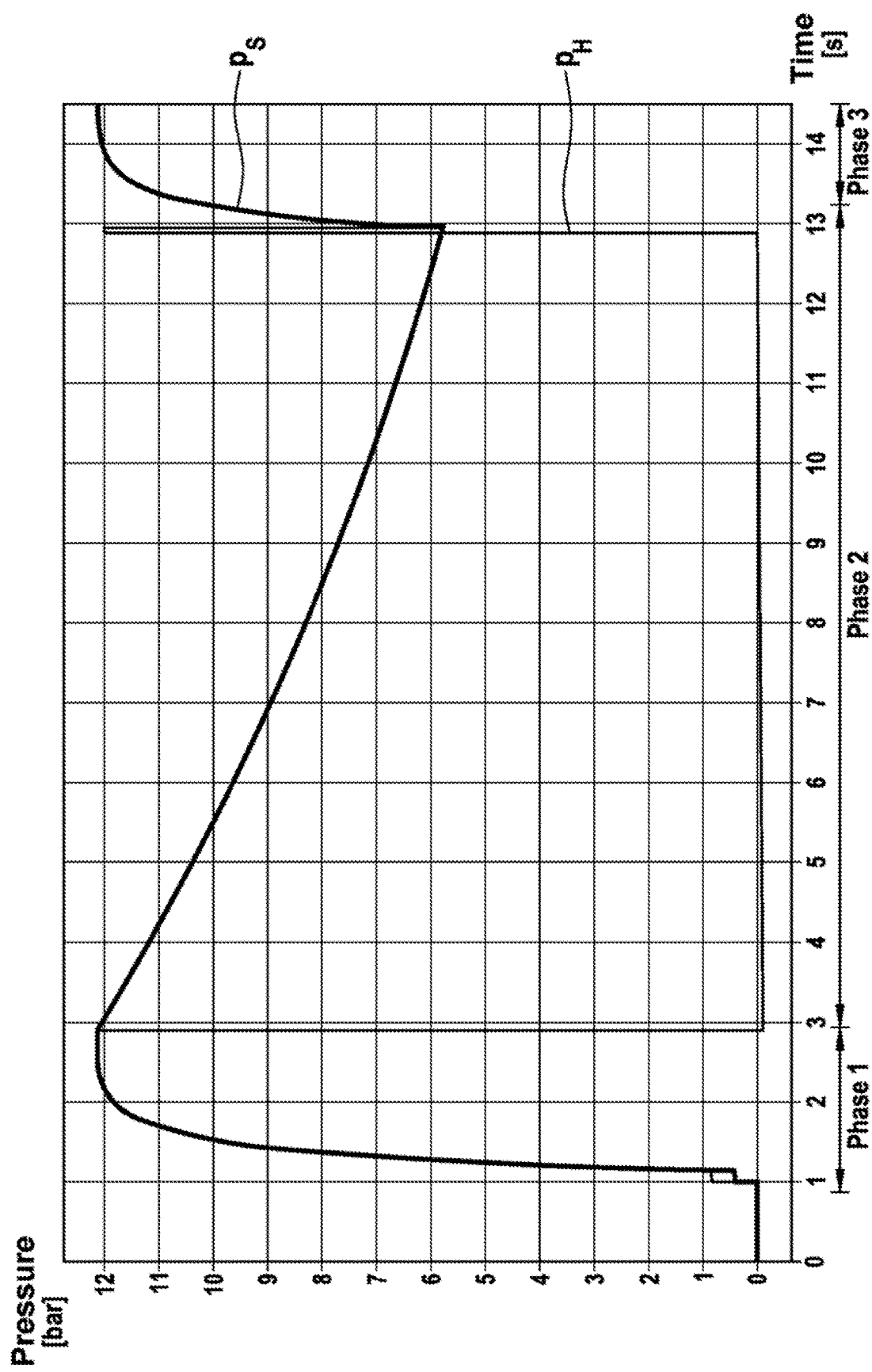
FIGS. 5 to 7: show diagrams relating to a second possibility for checking.
Figure 6:
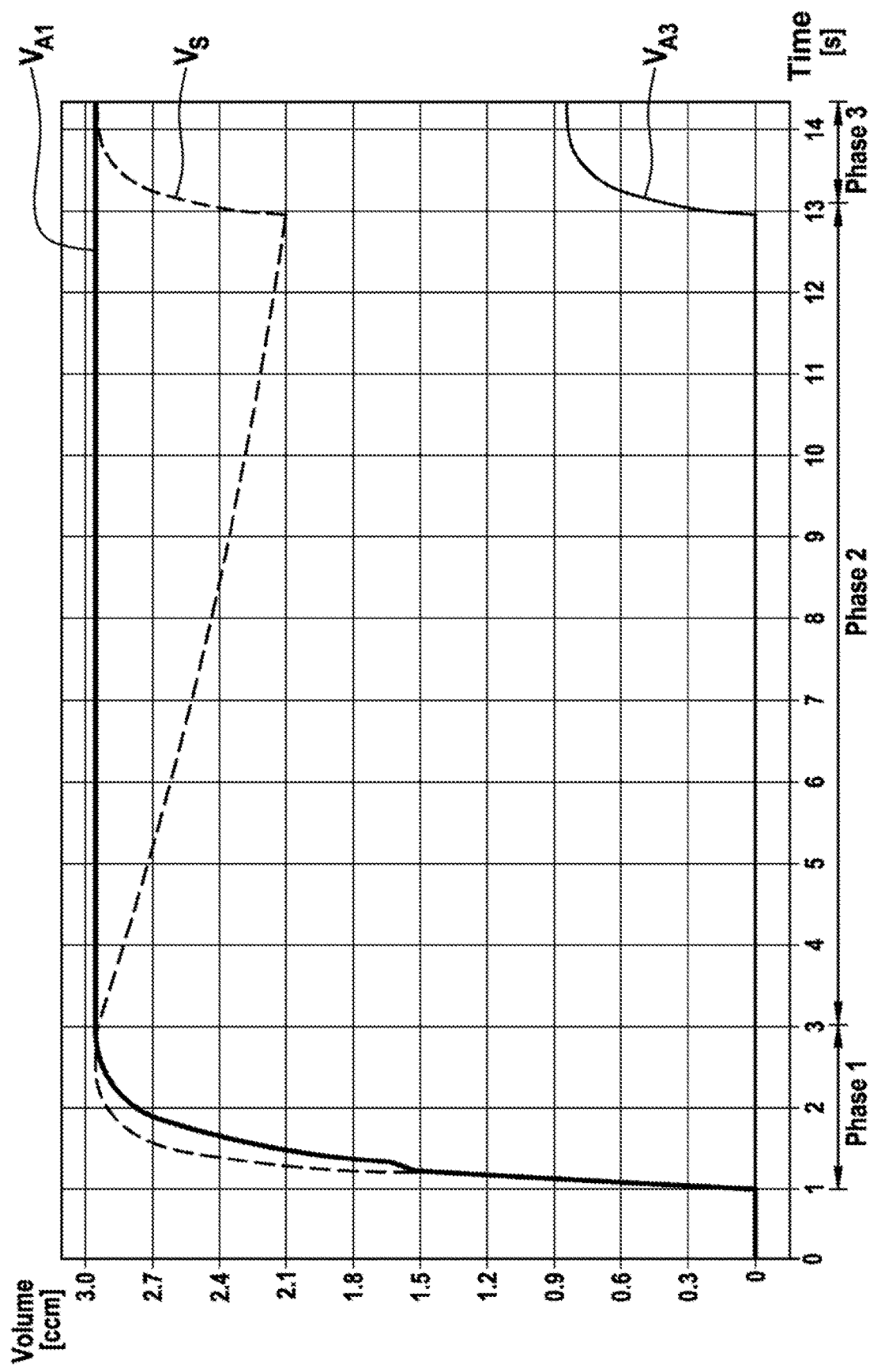
Figure 7:
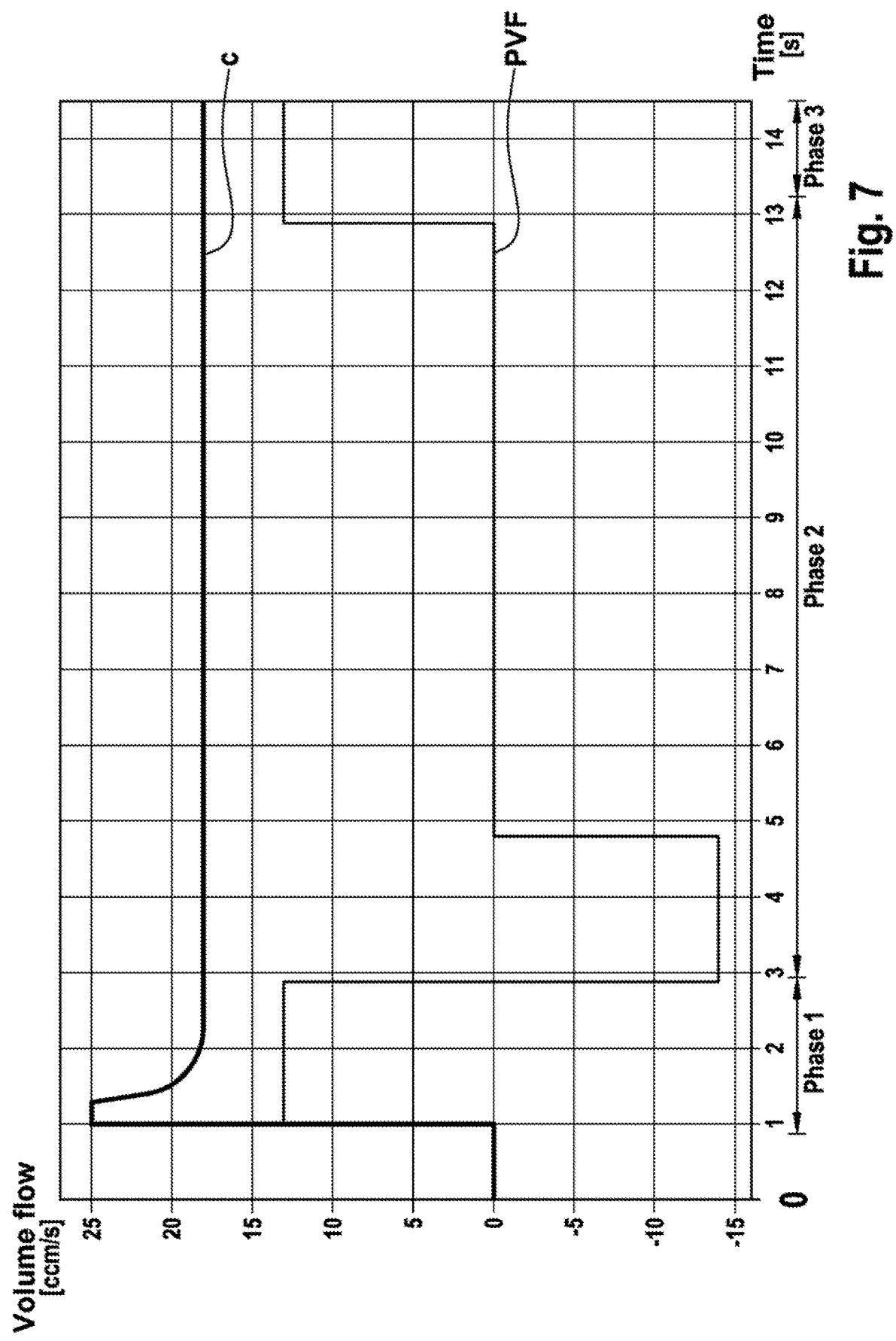
Figure 9:
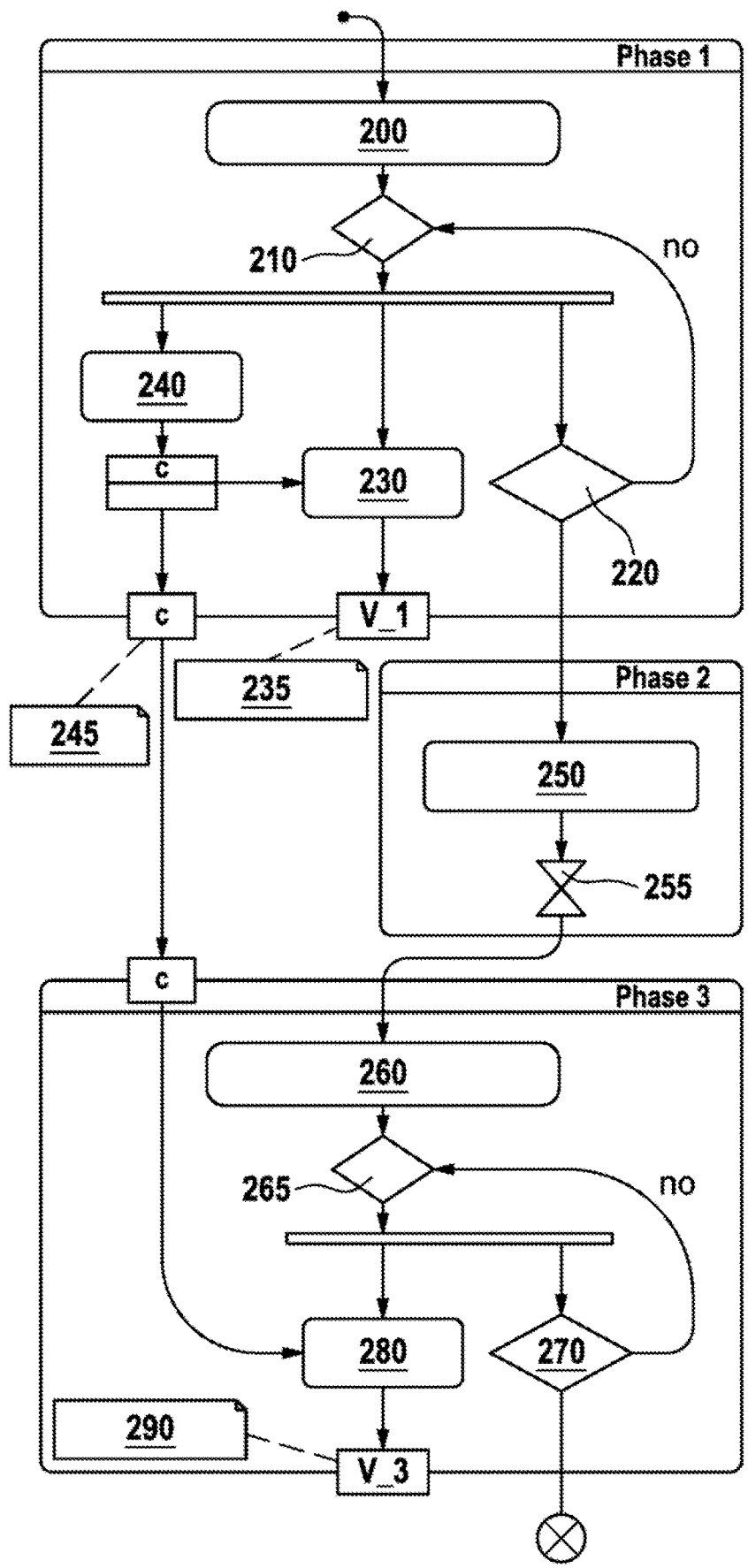
FIG. 9: shows a flow diagram relating to the second possibility for checking.

A further embodiment according to the flow diagram of FIG. 9 was simulated and the results illustrated in FIGS. 5 to 7. Here, FIG. 5 shows a profile with respect to time of pressures. FIG. 6 shows a profile with respect to time of volumes, and FIG. 7 shows a profile with respect to time of volume flows and the aperture parameter.

In accordance with the method sequence shown in FIG. 9, the described process is divided into three phases, namely a phase 1, a phase 2 and a phase 3. These are indicated in each case at the top right in respective summarizing boxes.

In block 200, it is firstly the case that a constant plunger volume flow, which generates dynamic pressure, is generated with the simulator valve 32 open. The pressure generator 5 again serves for this purpose.

In the rhombuses 210, 220, it is checked whether the dynamic pressure is in a steady state. For as long as this is not the case, the corresponding decision processes are repeated. In the presence of a steady-state dynamic pressure, in block 230, a volume balance is iterated in accordance with the above formula (6). The aperture parameters c required for this are generated in a dedicated block 240, wherein the above formula (5) is iterated for the purposes of aperture estimation.

A first volume V_1 is output as a result. Here, in block 245, the aperture parameters c are recorded as a result. In block 235, a charging volume V_1 in the simulator from phase 1 is recorded, in the context of a volume balance, as a result.

In phase 2, the plunger volume flow which generates dynamic pressure is subsequently shut off in block 250. Here, the simulator valve 32 is closed.

A waiting time of in the present case 10 s is then introduced in a waiting loop 255, during which waiting time no plunger volume flow is generated and no valve is actuated. During this time, liquid emerges from the simulator 3 solely owing to leakage through the simulator valve 32. The simulator 3 is discharged in this way.

The process then continues with phase 3. Here, a constant plunger volume flow which generates dynamic pressure is firstly generated in block 260, with the simulator valve 32 initially still closed, using the pressure generator 5. In rhombuses 265, 270, it is in turn checked whether the dynamic pressure is in a steady state. If this is the case, the simulator valve 32 is opened and the volume balance is iterated in accordance with the above formula (6). A volume V_3 is output as a result. In block 290, as a result of phase 3, the charging volume V_3 in the simulator 3 is recorded.

In phase 1, the simulator 3 is fully charged. In phase 2, the simulator discharges owing to leakage. In phase 3, the simulator is charged again by the volume that it lost in phase 2 owing to leakage. Therefore, the greater the leakage through the simulator valve 32, the greater the difference between the two ascertained volumes V_1, V_3. A check of the simulator valve 32 for leaks can be performed in this way.

By way of illustration, a simulation for a system according to FIG. 1 with leakage of 0.01 cm³/s via the simulator valve 32 was simulated. The results are described below.

It is assumed in this embodiment that the leakage via the simulator valve 32 is independent of the throughflow direction. In this case, with the simulator valve open, the simulator 3 can firstly be charged by means of the dynamic pressure (phase 1). The charging is performed until the dynamic pressure has settled to a steady state and the aperture parameter has been estimated in a stable manner in accordance with the above formula (5). Here, the pressure $p_s$ in the simulator 3 increases, as can be seen in FIG. 5. The pressure $p_H$ in the master cylinder 2 likewise increases. As can be seen in FIG. 6, the volume $V_s$ in the simulator 3 and a volume balance $V_{A1}$ in the form of a charging volume in simulator 3 of phase 1 also increase.

The simulator valve 32 is subsequently closed and the actuator piston 36 is stopped (phase 2). During this time, leakage volume flows from the simulator 3 to the brake fluid reservoir 4. The simulator 3 thus discharges, and pressure $p_s$ and volume $V_s$ in the simulator 3 decrease, as can be seen in FIGS. 5 and 6.

Finally, the simulator valve 32 is opened again and the simulator 3 is charged by means of the dynamic pressure (phase 3). The volume $V_s$ in the simulator 3 thus increases again and, in addition, a volume balance $V_{A3}$ in the form of a charging volume in the simulator 3 of phase 3 increases.

The leakage volume that flowed in phase 2 corresponds to a volume balance according to the above formula (6), which balances the volume within phase 3. This can be seen in FIG. 6.

FIG. 6 shows that the balanced volume within phase 3 corresponds to the leakage volume during phase 2. In other words, the simulator 3 has discharged in phase 2 owing to leakage and is now being recharged in phase 3, which can be measured on the basis of a volume balance.

Phase 3 can in principle be omitted—apart from the opening of the simulator valve 32—if the volume intake of the simulator 3 for the master brake cylinder pressure at the start of phase 3 is known. The leakage volume then results from the difference in relation to the volume balance of phase 1. The volume intake of the simulator 3 versus the master brake cylinder pressure can be obtained in phase 1 if the balanced volume is set in relation to the master brake cylinder pressure.

By means of the embodiments described, it is possible in particular for a diagnostic valve to be omitted and thus for corresponding material and manufacturing expenditure to be saved. This makes it possible for the brake system to be manufactured at lower cost and, moreover, ensures a relatively low maintenance requirement.

The mentioned steps of the method according to an aspect of the invention may be executed in the sequence indicated. However, they can also be executed in a different order as far as this is technically appropriate. In one of its embodiments, for example with a specific combination of steps, the method according to an aspect of the invention may be carried out in such a way that no further steps are executed. However, in principle, further steps can also be carried out, even steps that have not been mentioned.

The claims which form part of the application do not represent any dispensing with the attainment of further protection.

If it is found in the course of the proceedings that a feature or a group of features is not absolutely necessary, then the applicant aspires right now to a wording for at least one independent claim that no longer has the feature or the group of features. This may be, by way of example, a subcombination of a claim present on the filing date or may be a subcombination of a claim present on the filing date that is limited by further features. Claims or combinations of features of this kind requiring rewording are intended to be understood to be covered by the disclosure of this application as well.

It should further be pointed out that refinements, features and variants of aspects of the invention which are described in the various embodiments or exemplary embodiments and/or shown in the figures can be combined with one another in any desired manner. Single or multiple features may be interchanged with one another in any desired manner. Combinations of features arising therefrom are intended to be understood to be covered by the disclosure of this application as well.

Back-references in dependent claims are not intended to be understood as dispensing with the attainment of independent substantive protection for the features of the back-referenced dependent claims. These features may also be combined with other features in any desired manner.

Features which are disclosed only in the description or features which are disclosed in the description or in a claim only in conjunction with other features may fundamentally be of independent significance essential to aspects of the invention. They may therefore also be individually included in claims for the purpose of distinction from the prior art.

The invention claimed is:

1. A method for monitoring a hydraulic brake system for a motor vehicle,
    wherein the brake system has the following:
        a master brake cylinder with at least one breather hole,
        an electrically operated pressure generator,
        a simulator comprising a simulator piston and a simulator spring disposed within an interior of the simulator,
        a simulator valve, and
        a main line,
    wherein the master brake cylinder is connected to the pressure generator via the main line and the simulator is connected via the simulator valve to the main line, between the master brake cylinder and the pressure generator,
    wherein the method comprises:
        generating a volume flow by the pressure generator, wherein the volume flow flows from the pressure generator via the main line to the master brake cylinder and exits the latter via the breather hole, establishing a volume balance as the difference between the volume that has been discharged from the pressure generator into the main line up to a particular time minus a volume that has exited the master brake cylinder via the breather hole up to the particular time, and identifying a state of the brake system on the basis of the volume balance or on the basis of a profile with respect to time of the volume balance, wherein the volume that has exited the master brake cylinder via the breather hole up to the particular time is determined by integration of an outflow of the volume flow through the breather hole over time, wherein the outflow is determined on the basis of an aperture parameter and a measured pressure in the brake system or in the master brake cylinder, and wherein the aperture parameter is determined iteratively; and/or determined by a parameter estimation method, such that the volume flow and the outflow are equal in the steady state.

2. The method as claimed in claim 1, wherein the volume that has been discharged from the pressure generator into the main line up to the particular time is determined on the basis of operating data of the pressure generator.

3. The method as claimed in claim 1, wherein the aperture parameter is iterated as follows:

$$\hat{c}_k = \hat{c}_{k-1} + \mu \times (Q_k - c_{k-1} \times \sqrt{P_k})$$

where:
$\hat{c}_k$ is the aperture parameter at the iteration step k,
$\mu$ is an iteration parameter,
$Q_k$ is the volume flow at the iteration step k, and
$P_k$ is the pressure at the iteration step k.

4. The method as claimed in claim 1, wherein the aperture parameter is determined in the presence of constant pressure and/or constant volume flow.

5. The method as claimed in claim 1, wherein the volume flow is generated continuously for a period of time with the simulator valve closed;
wherein an air volume in the master brake cylinder is determined on the basis of an initial volume balance, and/or
wherein a leakage of the simulator valve is determined on the basis of a volume balance over the period of time.

6. The method as claimed in in claim 1, wherein the volume flow is generated continuously for a period of time with the simulator valve closed;
wherein an air volume in the master brake cylinder is determined on the basis of an initial volume balance, and/or
wherein a leakage of the simulator valve is determined on the basis of a volume balance over the period of time, and
wherein the aperture parameter is determined after a predefined or determined initial time in the period of time.

7. The method as claimed in claim 1, wherein an aperture is arranged in the breather hole or downstream of the breather hole in terms of flow.

8. The method as claimed in claim 1, wherein a linear actuator is used as the pressure generator.

9. The method as claimed in claim 3, wherein the aperture parameter is determined in the presence of constant pressure and/or constant volume flow.

10. A brake system for a motor vehicle, which brake system comprises:
a master brake cylinder with a breather hole,
an electrically operated pressure generator,
a simulator comprising a simulator piston and a spring disposed within an interior of the simulator,
a simulator valve, and
a main line,
wherein the master brake cylinder is connected to the pressure generator via the main line and the simulator is connected via the simulator valve to the main line, between the master brake cylinder and the pressure generator,
and wherein the brake system furthermore has an electronic control device which is configured for carrying out a method as claimed in claim 1.

11. A method for monitoring a hydraulic brake system for a motor vehicle,
wherein the brake system has the following:
a master brake cylinder with at least one breather hole,
an electrically operated pressure generator,
a simulator comprising a simulator piston and a simulator spring disposed within an interior of the simulator,
a simulator valve, and
a main line,
wherein the master brake cylinder is connected to the pressure generator via the main line and the simulator is connected via the simulator valve to the main line, between the master brake cylinder and the pressure generator,
the method comprising:
generating a volume flow by the pressure generator, wherein the volume flow flows from the pressure generator via the main line to the master brake cylinder and exits the latter via the breather hole,
establishing a volume balance as the difference between the volume that has been discharged from the pressure generator into the main line up to a particular time minus a volume that has exited the master brake cylinder via the breather hole up to the particular time, and
identifying a state of the brake system on the basis of the volume balance or on the basis of a profile with respect to time of the volume balance,
wherein the volume that has exited the master brake cylinder via the breather hole up to the particular time is determined by integration of an outflow of the volume flow through the breather hole over time,
wherein the outflow is determined on the basis of an aperture parameter and a measured pressure in the brake system or in the master brake cylinder, and
wherein the outflow is determined:
as a product of aperture parameter and the square root of the pressure; and/or
as a product of the aperture parameter and pressure; and/or
as a sum of a product of a first one of the aperture parameter and the pressure, on the one hand, and a product of a second one of the aperture parameter and the square root of the pressure, on the other hand.

12. The method as claimed in claim 11, wherein at least of the first aperture parameter and the second aperture parameter is/are determined iteratively; and/or wherein at least of the first aperture parameter and the second aperture parameter is/are determined by a parameter estimation method, such that the volume flow and the outflow are equal in the steady state.

13. A method for monitoring a hydraulic brake system for a motor vehicle,
   wherein the brake system has the following:
      a master brake cylinder with at least one breather hole,
      an electrically operated pressure generator,
      a simulator,
      a simulator valve, and
      a main line,
   wherein the master brake cylinder is connected to the pressure generator via the main line and the simulator is connected via the simulator valve to the main line, between the master brake cylinder and the pressure generator,
   wherein the method comprises:
      generating a volume flow by the pressure generator, wherein the volume flow flows from the pressure generator via the main line to the master brake cylinder and exits the latter via the breather hole,
      establishing a volume balance as the difference between the volume that has been discharged from the pressure generator into the main line up to a particular time minus a volume that has exited the master brake cylinder via the breather hole up to the particular time,
      identifying a state of the brake system on the basis of the volume balance or on the basis of a profile with respect to time of the volume balance,
      generating the volume flow for a first period of time with the simulator valve open, subsequently
      closing the simulator valve for a second period of time with the pressure generator deactivated, subsequently
      generating the volume flow for a third period of time with the simulator valve open, and ascertaining leakage of the simulator valve in the third period of time on the basis of a volume balance.

14. The method as claimed in claim 13, wherein the aperture parameter is determined in the first period of time and/or in the third period of time after charging of the simulator.

* * * * *

UNITED STATES PATENT AND TRADEMARK OFFICE
CERTIFICATE OF CORRECTION

PATENT NO. : 12,030,471 B2
APPLICATION NO. : 16/973499
DATED : July 9, 2024
INVENTOR(S) : Christian Courth et al.

It is certified that error appears in the above-identified patent and that said Letters Patent is hereby corrected as shown below:

In the Claims

In Column 11, Line 30 (Approx.), Claim 3: "$\hat{c}_k = \hat{c}_{k-1} + \mu \times (Q_k - \hat{c}_{k-1} \times \sqrt{P_k})$," should be -- $\hat{c}_k = \hat{c}_{k-1} + \mu \times (Q_k - \hat{c}_{k-1} \times \sqrt{P_k})$ --.

In Column 11, Line 48, Claim 6: "claimed in in claim" should be -- claimed in claim --.

Signed and Sealed this
Eighth Day of October, 2024

Katherine Kelly Vidal
*Director of the United States Patent and Trademark Office*